United States Patent [19]

Yen et al.

[11] Patent Number: 4,601,639
[45] Date of Patent: Jul. 22, 1986

[54] NODALIZED ROTOR

[75] Inventors: Jing G. Yen, Arlington; David A. Popelka, Bedford, both of Tex.

[73] Assignee: Bell Helicopter Textron Inc., Fort Worth, Tex.

[21] Appl. No.: 590,987

[22] Filed: Mar. 19, 1984

[51] Int. Cl.[4] .............................................. B64C 27/46
[52] U.S. Cl. .................................... 416/230; 416/144; 416/226
[58] Field of Search ............... 416/230 R, 230 A, 226, 416/144, 500, DIG. 2, 145

[56] References Cited

U.S. PATENT DOCUMENTS

| | | | |
|---|---|---|---|
| 1,082,750 | 12/1913 | Jacomy | 416/DIG. 2 |
| 3,574,484 | 4/1971 | Lamb, Jr. | 416/144 |
| 3,713,751 | 1/1973 | Fradenburgh et al. | 416/144 |
| 3,999,888 | 12/1976 | Zincone | 416/145 |
| 4,247,255 | 1/1981 | De Rosa | 416/230 A |
| 4,427,340 | 1/1984 | Metzger et al. | 416/230 A |

FOREIGN PATENT DOCUMENTS

| | | | |
|---|---|---|---|
| 2658917 | 7/1977 | Fed. Rep. of Germany | 416/145 |
| 260806 | 1/1970 | U.S.S.R. | 416/145 |

OTHER PUBLICATIONS

Design of Helicopter Rotor Blades for Desired Placement of Natural Frequencies by David A. Peters et al. Optimum Design of Rotor Blades for Vibration Reduction in Forward Flight by Friedmann et al May 9, 1983. Hub Loads Reduction by Modification of Blade Torsional Response by Sesi B. R. Kottapalli May 9, 1983. Helicopter Vibration Reduction by Rotor Blade Modal Shaping by Robert B. Taylor May 1982.

Primary Examiner—Robert E. Garrett
Assistant Examiner—John Kwon
Attorney, Agent, or Firm—Richards, Harris, Medlock & Andrews

[57] ABSTRACT

A nodalized rotor system is provided for a multi-bladed helicopter. Equally spaced radial arms each have an inboard flapping section to accommodate beam-wise blade flapping and an outboard flex section to accommodate pitch changes. A blade is coupled to the end of each arm with a cuff and pitch horn rigidly connected to the blade and pivotally connected to its arm in the region of the flapping section. The blade has a concentration of weight over the section of blade extending from about 32% to 42% of the hub-blade radius of running weight four times the running weight at 50% of the hub-blade radius. Said blade has a reduced mass at outboard 30% of the hub-blade radius, at a level of 80% of the running weight at 50% of the hub-blade radius.

10 Claims, 9 Drawing Figures

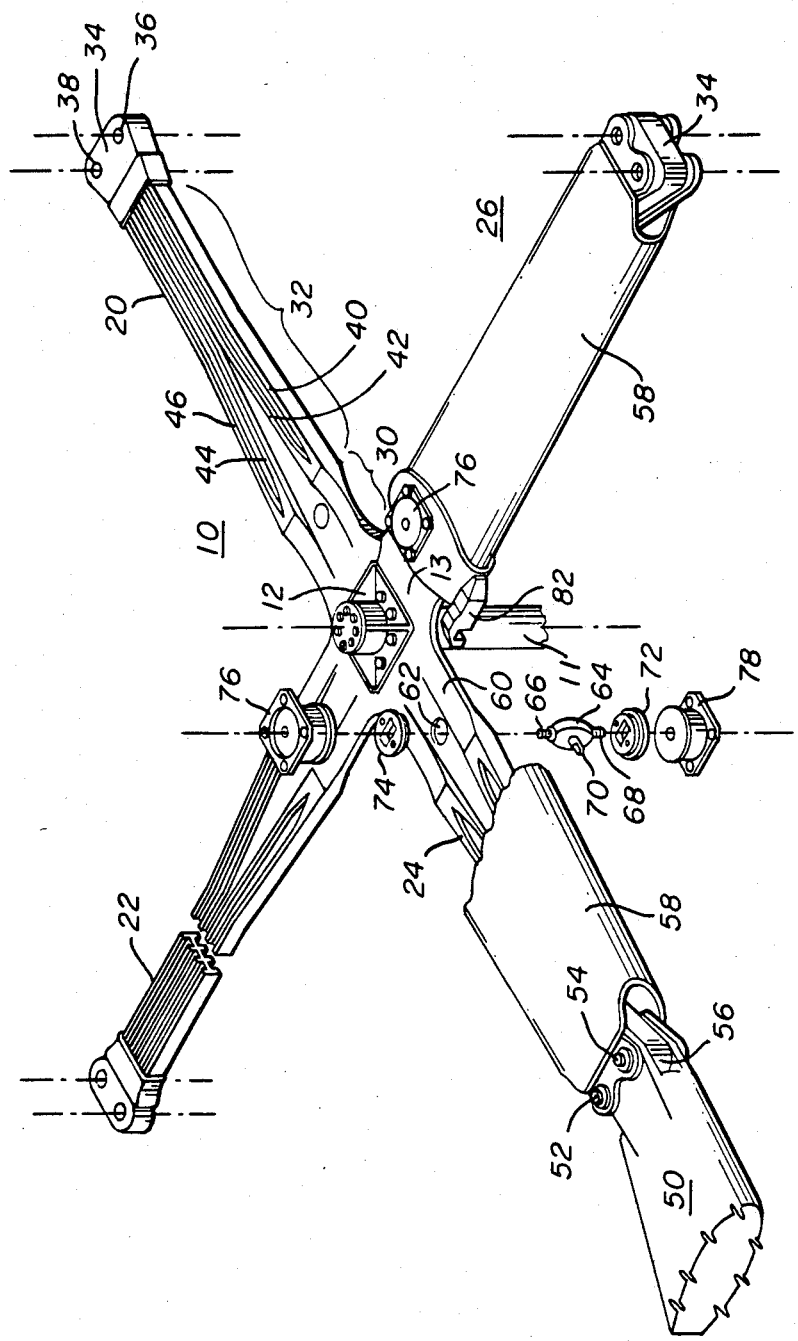

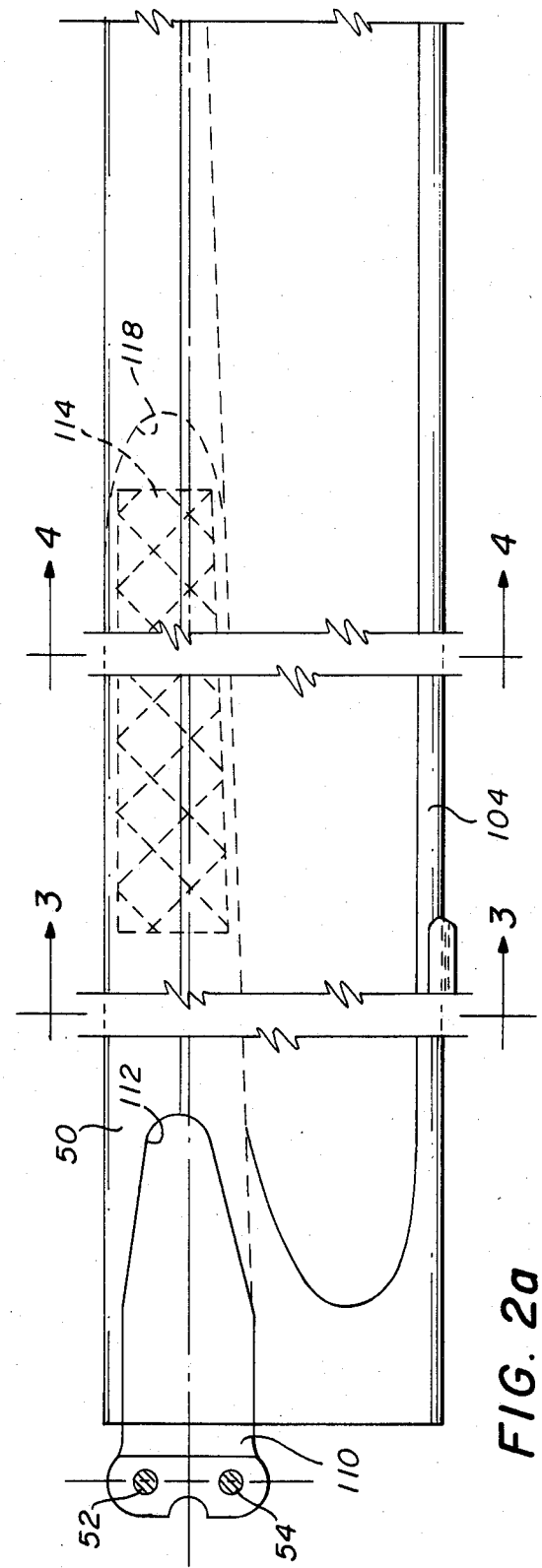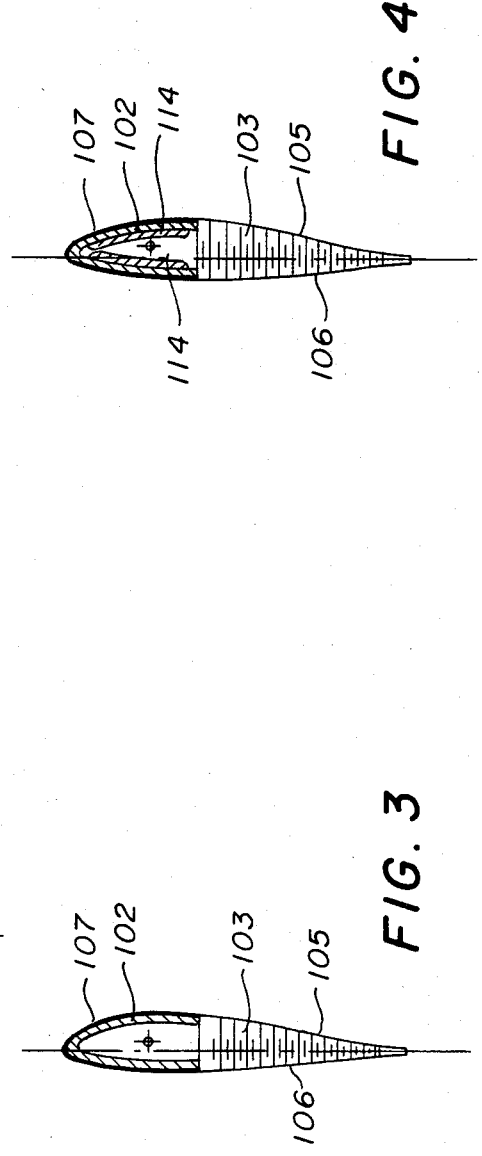

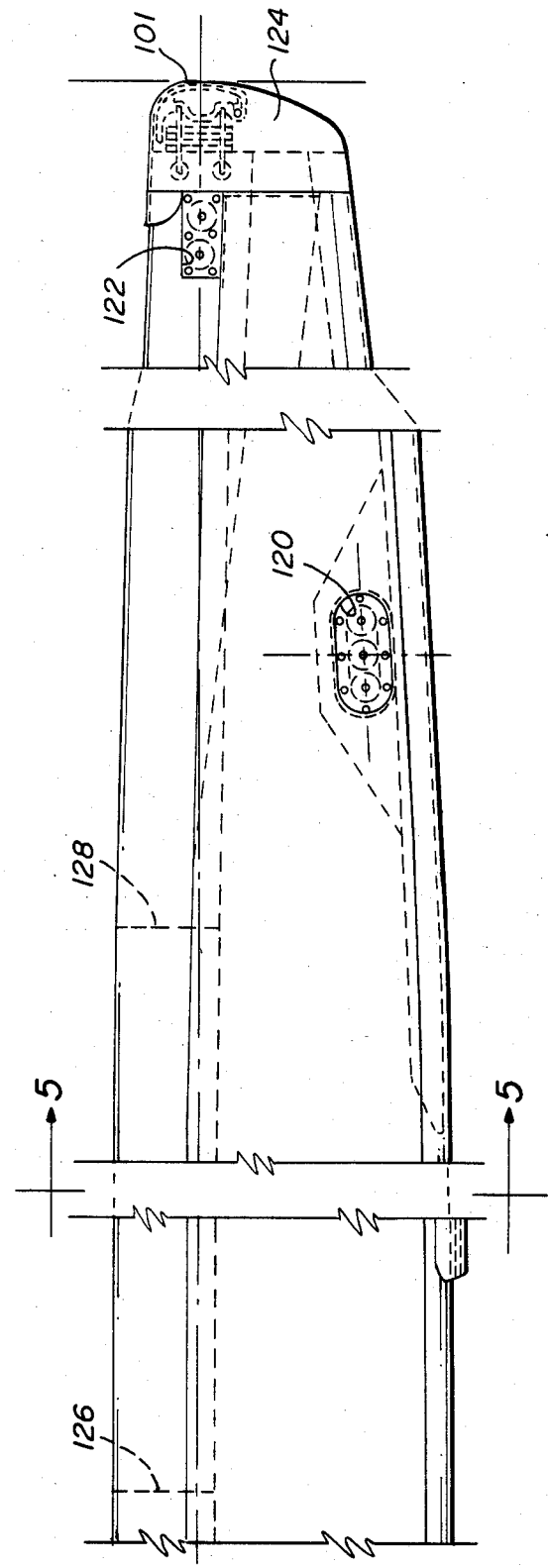
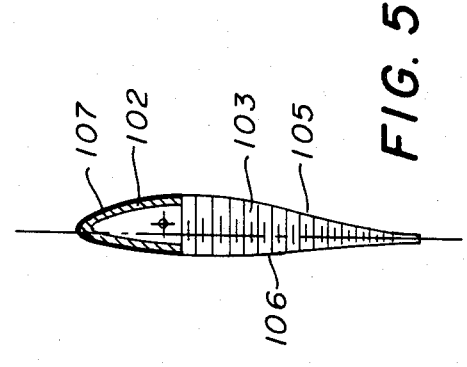
FIG. 2b
FIG. 5

NODALIZED ROTOR

TECHNICAL FIELD

This invention relates to a helicopter and more particularly a rotor system that exhibits significantly low vibration in the airframe.

BACKGROUND ART

It is becoming increasingly important to minimize vibration in a helicopter. Stringent requirements exist if crew and passenger comfort are to be present. The life of structural components and electronic equipment is greater with minimized vibration provided by special mounting structures. In military aircraft, the presence of armaments and the necessity for accurate fire control make stabilization of the aircraft and minimization of aircraft vibration important.

Heretofore, at least one project was directed at reducing vibration by using modal shaping. Such effort was based on the goal of reducing vibration levels in forward flight by modifying the mass distribution and to a lesser extent the stiffness distribution of the blade by using a modal shaping parameter. In another project, vertical hub shears due to blade flap-wise bending were minimized using mathematical programming techniques. Both programs were said to be based upon simple linear models for blade vibration employing modal analysis and the principles of super-position. Some findings indicate that mere addition of mass to the tip of the blade produces beneficial changes in the modal shaping parameter. The concept of vibration reduction by adding tuning masses has been used in rotor design prior hereto. In a further effort, non-structural tuning masses added to the outboard segments of the blade determined in an automated manner by a structural optimization process.

From the foregoing, it is apparent that there is a demand for further reduction of vibration.

DISCLOSURE OF THE INVENTION

A four-bladed rotor of nodalized rotor construction is provided which minimizes both the 4/Rev vertical hub shear and the 4/Rev pitching and rolling hub moment acting on the airframe. With these oscillatory loads minimized, the airframe does not vibrate at 4/Rev and the ride quality of the aircraft on which the rotor is operative is excellent.

In a more specific aspect, vibratory 4/Rev shears and moments are attenuated by carefully tuning three vibration modes of the rotor which dominate the 4/Rev vibration. Using the proper distribution of stiffness and mass results in optimum tuning of these three modes and hence low vibration.

The three rotor modes and their contribution to cabin vibration are as follows:

1. The third collective beam-wise bending mode which contributes to the majority of the 4/Rev hub vertical shear.
2. The second cyclic beam-wise mode which dominates the 3/Rev blade root beam-wise moments and creates the majority of the 4/Rev hub moments on the airframe.
3. The second cyclic chord-wise bending mode, because of significant beam-chord coupling, produces 5/Rev blade root beam-wise moments which create additional 4/Rev moments on the airframe.

The vibration caused by the foregoing are minimized by:

(a) Employing a stiff, lightweight hub approximately four times as stiff as the blade at 50% radius but of approximately the same running weight as the blade.

(b) Providing a large concentration of mass from approximately 32% to 42% of hub-blade radius. The mass at this location preferably is approximately four times the running weight at 50% radius.

(c) Providing a reduction in mass in the outboard 30% of the hub-blade to approximately 80% of the weight at 50% radius.

(d) Providing an increased beam-wise and chord-wise stiffness for the entire blade.

Thus in accordance with the invention, a nodalized rotor system is provided for a four bladed helicopter. A hub is provided with equally spaced radial arms. A blade is coupled to each of the arms, each of the blades being characterized by:

1. A concentration of mass from about 32% to 42% of the hub-blade radius with the running weight about four times the running weight at 50% of the hub-blade radius.

2. A reduction in the mass of the outboard 30% of the blade to a running weight of about 80% of the running weight at 50% radius.

3. Beam-wise and chord-wise stiffnesses of the hub are approximately four times those at 50% of radius. The blade running weight at the hub is approximately the same as the running weight at 50% radius.

For a more complete understanding of the invention, and for further objects and advantages thereof, reference may now be had to the following description taken in conjunction with the accompanying drawings.

BRIEF DESCRIPTION OF THE DRAWINGS

FIG. 1 is an isometric view of a four bladed rotary yoke in a partially exploded view.

FIGS. 2a, 2b are a top view of a blade.

FIG. 3 is a section view taken at lines 3—3 of FIG. 2a.

FIG. 4 is a sectional view taken at lines 4—4 of FIG. 2a; and

FIG. 5 is a sectional view taken along the lines 5—5 of FIG. 2b.

DETAILED DESCRIPTION

Figure 6:
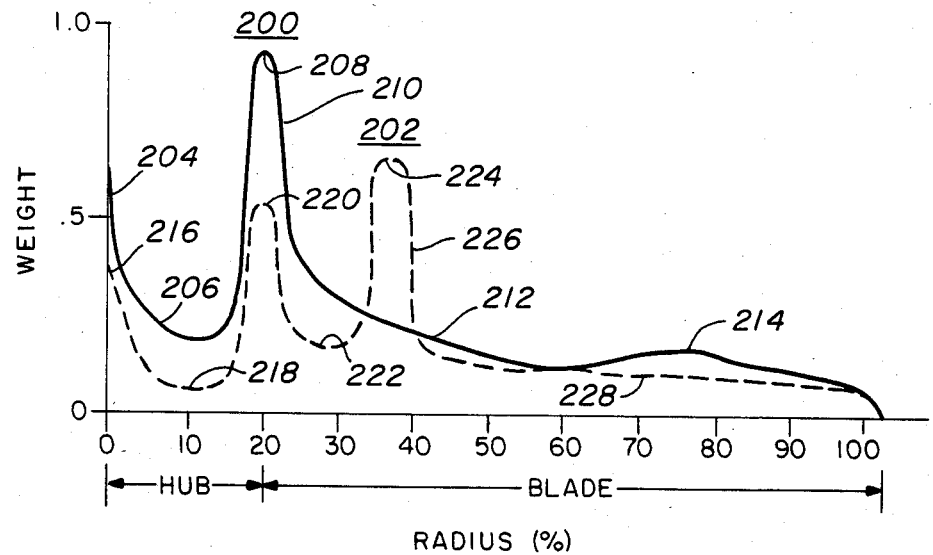
FIG. 6 is a graph showing preferred weight vs. blade radius distribution.

The hub-blade system shown in FIGS. 1-5 is of construction which achieves minimum vibration. Briefly stated, a stiff, lightweight hub region serves to reduce the curvature of the third collective mode at the hub which results in reduction of the 4/Rev vertical shear. A large mass increase extending from 32% to 42% of the radius causes the second cyclic beam-wise mode to attenuate the 3/Rev hub moments and at the same time, reduce 4/Rev vertical shear from the third collective mode. The reduction in mass in the outboard 30% of the blade lowers the 3/Rev root moment. The increased chord-wise stiffness causes the second cyclic chord-wise mode frequency to be very near 5/Rev. This increases the 5/Rev response of this mode and amplifies the 5/Rev beam-wise moment which cancels the 5/Rev moment from the remaining modes. The increase in beam-wise stiffness raises the frequency of the third collective mode well above 4/Rev which reduces the 4/Rev response of the mode and lowers the 4/Rev hub shear. Since the nodalized rotor attenuates the 4/Rev hub vertical shear and the 4/Rev hub moments at the source, a smooth ride is achieved without relying on vibration isolation systems.

Figure 1

FIG. 1 illustrates a four-blade rotor yoke 10 mounted rigidly on the upper end of a mast 11 by means of a hub assembly including a pair of hub clamp plates. Only the upper hub clamp plate 12 is visible.

The hub assembly is characterized by a flat composite fiber-reinforced center yoke section which is secured between the lower face of the upper clamp plate 12 and the upper face of a bottom clamp plate. Four identical arms 20, 22, 24 and 26 extend from the center hub section 13.

Arm 20 comprises a flapping section 30 located immediately adjacent the center hub section 13. A feathering section 32 extends outboard from the flapping section 30 and terminates in a blade bolt attachment structure 34 which is integral with the feathering section 32. The attachment structure 34 has two tangentially-spaced bolt receiving holes 36 and 38.

The feathering section 32 is comprised of four ribs 40, 42, 44 and 46 made up of reinforcing fibers embodied in a solid matrix. The ribs are spaced apart inplane. Fibers in ribs 40 and 42 encircle a fixture defining the bolt hole 36. The fibers in ribs 44 and 46 are formed in a continuous loop that encircles a fixture defining the bolt hole 38 and pass through hub section 13 and then outward in arm 24 to and around a bolt fixture which, as shown, receives bolts 52 and 54.

The inboard end of blade 50 is shown anchored to arm 24 by bolts 52 and 54 to the attachment structure 56. A cuff 58 in the form of an elliptical composite tube is secured integrally with blade 50 by attachment structure 56 and bolts 52 and 54. The cuff 58 extends inwardly and is shown broken away. It would extend to about a midpoint along the length of the flapping section 60 in arm 24. Structure is then provided for resiliently anchoring the inboard end of cuff 58 to the flapping section 60 at about the center of section 60. More particularly, a hole 62 extends vertically through the center of section 60. A shear restraint structure 64 is provided to be mounted in the aperture 62. The shear restraint element includes vertical studs 66 and 68 forming part of a body having an elastomeric center body bonded inside a circular ring integral with studs 66 and 8. A span-wise stub shaft 70 is bonded in the center of the elastomeric center body. The stub shaft 70 has flattened ends which are thinner than the flapping section 30 at the location of hole 62. Shear restraint 64 is secured in hole 62 by a lower clamp plate 72 and an upper clamp plate 74. The upper stud 66 extends into the lower end of a lead-lag damper fixture 76. The lower stud 68 extends downward into a lead-lag damper fixture 78.

Referring now to arm 26, cuff 58 extends inboard from the attachment fixture 34. Cuff 58 is secured to attachment fixture 34 and to blade 50 by blade bolts. The cuff 58 is shown with the upper lead-lag damper 76 mounted in the inboard end of the cuff 58. A pitch horn 82 is secured to the inboard end of the cuff 58.

Thus, it will be understood that the four arms 20, 22, 24 and 26 are identical in construction, each of them being provided with blade bolt attachment fixtures on the outboard end, each of them being attached to the inboard end of a blade and each of them being provided with a cuff which encompasses the feathering section such as section 32 in each arm and extends to the flapping section such as sections 30 and 60 in each arm. Each cuff is connected through lead-lag dampers to a shear restraint member secured in an opening in the flapping section.

By such structure where the center mounting plate, the flapping elements, the feathering elements and the blade attachment structures are integrally formed in a unitary body utilizing fiber-reinforced composite materials, there can be provided a soft inplane bearingless rotor system with lower weight, greater reliability and lower maintenance than conventional soft inplane rotors which employ bearings. It will be seen that the hub assembly consists of a one-piece composite yoke, composite cuffs, elastomeric shear restraints, elastomeric lead-lag dampers and hub clamp plates.

In FIG. 1, the cuff 58 has been shown as a separate element secured to the blade and hub by the blade bolts such as bolts 52 and 54. It is to be understood that the cuff could be made an integral part of a blade. This may be particularly desirable where there is no requirement that the blade be foldable for stowage such as on marine vessels. Where there is no requirement for folding the blades, the blade and cuff made integral would be secured to the end of the yoke by fastening means other than the specific structure shown in FIG. 1. In such case, it is possible to provide a rotor system that is lighter in weight than where the blade bolt coupling arrangement as shown is used.

Where two blade bolts are spaced tangentially as in FIG. 1, blade folding is readily accomplished by removing one of the two pins and then pivoting the blade about the remaining pin as described in U.S. Pat. No. 4,252,504. Thus, the fastening structure has been shown with the understanding that modifications thereof may be employed.

Yoke arm 20 is characterized by an inboard flexural element 30 and outboard feathering element 32. Such flexural elements achieve flapping hinge offset from the center of mast 11. The feathering elements replace highly loaded bearings in which, in the prior art systems, opposed the centrifugal force in conventional soft inplane rotors. The feathering section 32 allows for tailoring flap-wise, inplane, axial and torsional stiffness substantially independently. In addition, the feathering section allows the use of filament-wound unidirectional belts which extend from the leading edge attachment bolt on one arm to and around the trailing edge attachment bolt on the opposite arm. To unify the unidirectional belts, pre-cut ±45° broad goods and unidirectional broad goods are incorporated radially to form web sections and provide the desired stiffness and strength in the yoke for fail-safe operation.

The term "broad goods" as that term is used herein refers to fabrics of fiberglass or graphite in which epoxy coated fibers either unidirectional or with ±45° orientation are utilized to be placed in a mold to cure the epoxy and unify the fibers and epoxy thus producing a composite structure.

Cuff 58 is inboard of blade 50. A metal pitch horn is attached at the inboard end of each cuff. Metal grip plates are bonded to the outboard end of the cuffs for attachment to the blade and yoke. Cuff 58 is elliptical in cross section and is built up with ±45° fabric and unidirectional broad goods to obtain the desired flap-wise, inplane and torsional stiffness. The elastomeric shear restraint is attached to the yoke near the outboard end of the flapping section with upper and lower elastomeric lead-lag dampers attached to the inboard end of the cuffs through the shear restraints. The shear restraints have radial elements for pitch change motion and spherical elements to allow for misalignment due to flapping and lead-lag motion. In order to work the lead-lag dampers and achieve the desired damping, the inplane stiffness of the yoke feathering section is lower than the inplane stiffness of the cuff.

Metal hub clamp plates attached to the central portion of the yoke provide for transmitting loads through the main rotor shaft 11.

The centrifugal load of the blade is transferred directly to the yoke at the blade-cuff-yoke attachment while the flap-wise and inplane loads are distributed between the cuff and yoke based substantially on their relative flap-wise and inplane stiffnesses. The cuffs react to the greatest portion of the flap-wise and inplane loads since it is the stiffest member both flap-wise and inplane. The blade torsion loads are transmitted to the control system through the cuff. Thus, the structure shown in FIG. 1 eliminates the highly loaded lead-lag and/or flapping bearings of conventional soft inplane rotors. It allows for extensive use of fiber and epoxy materials. Because of the presence of multiple independent belts, the blade mounting is rendered substantially fail-safe. It provides a lighter weight rotor due to the use of fiber and epoxy materials and the elimination of highly loaded bearings. It provides for an increase in reliability and decrease in maintenance. Unlike other bearingless rotors, it has elastomeric lead-lag dampers and does not solely rely on aeroelastic and structural damping to avoid ground resonance.

FIG. 2

Connector 110 has an elongated tongue 112 which is integrated into the materials making up the blade 50 for transmission of centrifugal forces on blade 50 to arm 24 and hub 12. Blade 50 is coupled to the end of arm 24 and extends to a blade tip which, by way of example, typically may be about 260 inches from the mast axis. The portion of the hub outboard of the thin flex section 30 is extremely stiff. Connector 110 is provided with a blade attachment fixture having holes 52 and 54 mating with like holes on the end of the arm 24. Blade 50 is constructed such that there is minimum beam deflection beyond the thin flapping section 30.

Blade 50 is a composite blade made up of materials including fiberglass broad goods, graphite and epoxy. A "D" section spar 102 is formed of fiberglass and epoxy and extends the length of blade 50. Honeycomb bodies shaped to define the trailing portion of the blade are secured to the rear of the spar 102. Skins 104 and 105 are made up of fiberglass fabric. The trailing edge of blade 50 includes layers of graphite along the entire length thereof to impart stiffness to blade 50. Spar 102 is made of graphite strands which extend span-wise of blade 50.

A heavy mass 114 extends along the inside of spar 102 from about 32% to 42% of the hub-blade. The 45° hatching in FIG. 2 extending from 32% to 42% points indicate the area actually occupied by the heavy mass 114. As best seen in FIG. 4, mass 114 is adhesively secured to the inside surface of the nose spar 102. Spanwise graphite fibers 107 extend to and beyond the 42% point where they taper off in the zone indicated by the dotted curve 118.

Unidirectional graphite fibers are also added at the blade location centered around the 76% of the hub-blade length.

As shown in FIG. 2, a recess is provided near the trailing edge of the blade for adding weights. Recess 120 has spaced apart cavities capable of receiving one, two or three cylindrical masses as may be necessary to fine tune the balance of blade 50. Similarly, near the tip, a recess 122 is provided for accommodating one or two weights. An end cap 124 is provided at the tip 101 of blade 50.

Referring to FIG. 6, performance characteristics exhibited by a conventional blade structure are illustrated by curve 200. The hub section is indicated as extending from the center of the mast to a point 20% of the radius.

Curve 202 illustrates the same parameters but for data obtained from tests on a system embodying the present invention.

FIG. 6 indicates substantially higher running weight in prior art system from the mast axis intersection 204 through the deep valley 206 and peak 208. Peak 208 is followed by a steep descent 210 followed by a gentler downward slope 212 with a slight increase 214 in the region of 65% to 85% of the hub-blade radius.

In contrast, a blade according to the present invention involves lighter weight in the hub section at the rotor axis 216, followed by a deeper trough leading to a relatively low peak 220 followed by a trough 222 centered at about 30% of the radius. This is followed by a high peak 224 followed by steep descent 226. The dotted curve of FIG. 6 indicates substantial increase in weight in the blade from about 32% to 42% of the hub-blade radius. The descent section 226 is followed by a gradual assymtotic further descent from 42% to the blade tip 228. Thus, FIG. 6 graphically portrays distinctive features of the present invention relative to conventional systems. The peak 224 results from the large mass from approximately 32% to 42% of hub-blade radius. This mass increase to achieve the performance shown in FIG. 6 requires approximately four times the blade running weight as measured at 50% of the radius.

Figure 7:
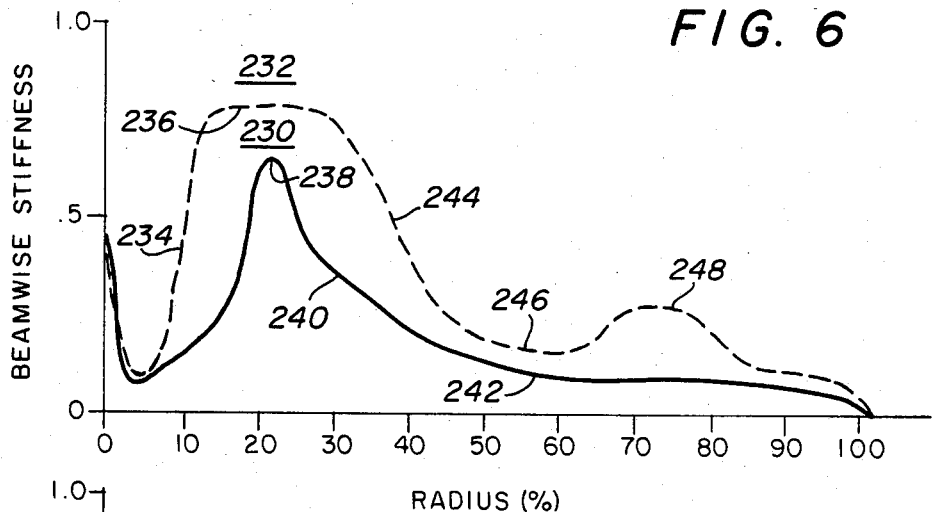
FIG. 7 is a graph showing a preferred beam-wise stiffness vs. blade radius.

Not only is the weight-radius distribution significant, but also beam-wise stiffness is important. FIG. 7 illustrates variations in beam-wise stiffness as a function of hub-blade radius. In FIG. 7, beam-wise stiffness of a prior art unit is shown by curve 230 whereas beam-wise stiffness of blades made in accordance with the present invention are represented by dotted curve 232. The two curves substantially coincide at the mast axis and both exhibit at deep trough occasioned by the presence of the flex sections 30 and 60. However, the abrupt rise 234 of the dotted curve 232 to a broad peak 236 represents a significant departure from conventional systems. Performance of prior art blades is indicated by the fairly narrow peak 238 which occurs at 20% of the radius.

Peak 238 is followed by a fairly steep descent 240 followed by a gentler slope 242 from about 30% to 90%. In contrast, curve 232 has a more gentle decline section 244 between 30% and 50% followed by a fairly gentle decline portion 246 at about 60% followed by a low peak 248 between 70% and 80%. Beam-wise stiffness is built into a blade to give it the characteristic shown by curve 232 by selection of characteristic of the broad goods employed. Utilization of predominately ±45° broad goods would lend less beam-wise stiffness to the blade section than if unidirectional glass fibers or graphite fibers were employed extending span-wise of the blade.

Figure 8:
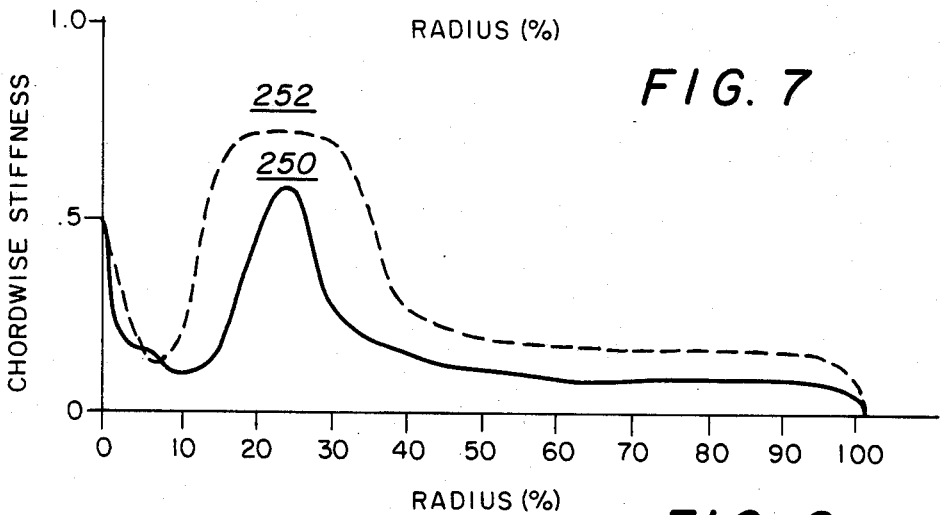
FIG. 8 shows a preferred relation between chord-wise stiffness and blade radius.

FIG. 8 illustrates variations in chord-wise stiffness as a function of radius. The variations in chord-wise stiffness is a function of radius for conventional blade is shown by curve 250. Chord-wise stiffness of a blade in accordance with the present invention is illustrated by curve 252. The relationship of curves 250 and 252 are much the same as relationship between curves 230 and 232. Peak 252 is broader and higher than curve 250. The peaks 250 and 252 being centered at about 20% of the radius with the present invention involving greater stiffness over a greater portion of the radius.

Having described the invention in connection with certain specific embodiments thereof, it is to be understood that further modifications may now suggest themselves to those skilled in the art, and it is intended to cover such modifications as fall within the scope of the appended claims.

We claim:
1. A nodalized rotor system for a four bladed helicopter comprising:
   (a) a hub having equally spaced radial arms;
   (b) a blade coupled each of said arms, each said blade having:
      i. a concentration of mass from about 32% to 42% of the hub-blade combination radius of running weight per unit length four times the running weight per unit length at 50% of the hub-blade combination radius;
      ii. reduced mass in the outboard 30% of the blade of running weight per unit length about 80% of the running weight per unit length at 50% radius; and
      iii. beam-wise and chord-wise stiffness of the hub region are approximately four times the stiffness at 50% blade radius with the hub running weight per unit length approximately the same as the blade running weight at 50% radius.

2. A nodalized rotor system for a four bladed helicopter comprising:
   (a) a hub having four equally spaced radial arms;
   (b) a blade coupled to each of said arms, each of the blades having a running weight distribution from root to tip characterized by a section inboard of the hub-blade combination mid point of running weight per unit length several times the running weight per unit length of the hub-blade combination at midpoint and having a section outboard of the mid point having a running weight per unit length less than the running weight per unit length at midpoint and hub stiffness about four times the stiffness of the blade at midpoint with the running weight per unit length at the hub being approximately the same running weight per unit length as the midpoint of the blade.

3. A nodalized rotor system for a multi-bladed helicopter which comprises:
   (a) a multiplicity of equally spaced radial arms each having an inboard flapping section to accommodate beam-wise blade flapping and having an outboard flex section to accommodate pitch changes;
   (b) a blade coupled to the end of each of said arms with a cuff and pitch horn rigidly connected to said blade and pivotally connected to said arm in the region of said flapping section, said blade having a concentration of weight over the section of blade extending from 32% of hub-blade combination length to 42% and having an outboard 30% of reduced weight, at a level of 80% of the running weight per unit length at 50% of the hub-blade combination radius.

4. A nodalized rotor system for a multi-bladed helicopter comprising:
   (a) a hub having equally spaced radial arms;
   (b) a blade coupled each of said arms, each said blade having a composite nose spar extending the length of said blade:
      i. heavy weight structure fitted to said spar for establishing a concentration of mass from about 32% to 42% of the hub-blade combination radius of running weight per unit length four times the running weight per unit length at 50% of the hub-blade combination radius;
      ii. reduced mass in the outboard 30% of the blade of running weight per unit length about 80% of the running weight per unit length at 50% radius; and
      iii. beam-wise and chord-wise stiffness of the hub region are approximately four times the stiffness at 50% blade radius with the hub running weight per unit length approximately the same as the blade running weight per unit length at 50% radius.

5. The combination of claim 4 wherein said heavy weight structure is contoured to nest inside said nose spar.

6. The combination set forth in claim 4 wherein said heavy weight is adhesively secured inside said nose spar.

7. The combination of claim 4 wherein the composite blade structure includes graphite fibers extending the length of the blade and with added span-wise fibers also added in a zone centered at about 74% of the hub-blade combination radius.

8. The combination set forth in claim 4 wherein said blade is a composite of broad goods, fiberglass and epoxy whereas the spar is formed of fiberglass and epoxy and extends the length of said blade.

9. The combination set forth in claim 8 wherein said span-wise graphite fibers are added to said composite balde at a blade location centered around 74% of the hub-blade combination radius.

10. The combination set forth in claim 4 wherein honeycomb bodies are shaped to define the trailing portion of said blade and are secured to said nose spar and wherein the trailing edge of each of said blades includes layers of graphite strands along the length thereof to impart stiffness to the blade.

* * * * *